United States Patent
Kirshtein et al.

(10) Patent No.: US 6,185,643 B1
(45) Date of Patent: Feb. 6, 2001

(54) METHOD AND APPARATUS FOR EXTENDING THE RANGE BETWEEN A COMPUTER AND COMPUTER PERIPHERALS

(75) Inventors: Philip M. Kirshtein, New Market; Robert R. Asprey, Harvest, both of AL (US)

(73) Assignee: Cybex Computer Products Corporation, Huntsville, AL (US)

(*) Notice: Under 35 U.S.C. 154(b), the term of this patent shall be extended for 0 days.

(21) Appl. No.: 08/971,223

(22) Filed: Nov. 15, 1997

(51) Int. Cl.[7] ............................. G06F 13/14; G06F 13/20
(52) U.S. Cl. ............................. 710/73; 710/62; 710/72
(58) Field of Search ............................. 710/1, 72, 73, 710/62

(56) References Cited

U.S. PATENT DOCUMENTS

| | | | |
|---|---|---|---|
| 4,257,029 | * 3/1981 | Stevens | 340/40 |
| 4,543,642 | 9/1985 | Hansen | 710/127 |
| 4,885,718 | 12/1989 | Asprey et al. | 710/101 |
| 4,987,572 | * 1/1991 | Scott | 370/91 |
| 5,133,081 | * 7/1992 | Mayo | 455/18 |
| 5,353,409 | * 10/1994 | Asprey et al. | 395/275 |
| 5,457,784 | * 10/1995 | Wells et al. | 710/535 |
| 5,504,540 | 4/1996 | Shatas | 348/844 |
| 5,587,824 | 12/1996 | Asprey | 359/154 |
| 5,602,595 | * 2/1997 | Citta et al. | 348/495 |
| 5,615,393 | 3/1997 | Kikinis et al. | 710/67 |
| 5,621,734 | 4/1997 | Mann et al. | 709/227 |
| 5,815,109 | 9/1998 | Tan | 341/177 |
| 5,859,545 | 1/1999 | Thornblad | 326/90 |
| 5,870,395 | * 2/1999 | Baran | 370/395 |
| 5,974,058 | 10/1999 | Burns et al. | 370/538 |
| 6,014,040 | 1/2000 | Tracy | 326/90 |

OTHER PUBLICATIONS

Universal Serial Bus Specification, Revision 1.1, Jan. 15, 1996.*

* cited by examiner

Primary Examiner—Thomas C. Lee
Assistant Examiner—Rehana Perveen
(74) Attorney, Agent, or Firm—Nixon & Vanderhye P.C.

(57) ABSTRACT

An apparatus, method, and system for providing a computer extender for connecting a computer at a first location to peripherals at a second location. The peripherals are located at distances greater than possible using standard computer cables. A cable coupling the locations and serving as the communication channel is a bundle of four pairs of wires, where three of the pairs provide video. The remaining pair provides for transfer of mouse information, keyboard information, vertical sync, horizontal sync, audio signals, modem signals, asynchronous data, and has a reserve capacity for other information.

44 Claims, 7 Drawing Sheets

METHOD AND APPARATUS FOR EXTENDING THE RANGE BETWEEN A COMPUTER AND COMPUTER PERIPHERALS

FIELD OF THE INVENTION

This application relates to an extension system for connecting a computer at a first site to peripherals at a second site and, more specifically, to an improved method and apparatus for providing an extension system.

BACKGROUND OF THE INVENTION

A personal computer is typically coupled to peripherals that serve as computer-user interfaces. Such peripherals may include a keyboard, a mouse, and a monitor. Typically standard cables connecting each peripheral are around four feet long. Because of the characteristics of the connecting cables and their interfaces, the cables do not provide a reliable peripheral connection when they are much longer than twenty feet.

There are situations where it is desirable to separate the computer from the peripherals at distances much greater than allowed by typical standard peripheral cables. The apparatus to extend the distance between a computer and peripherals is called an extender or an extension system. One such system, PC-Extender Plus is available from Cybex Computer Products of Huntsville, Ala. The PC-Extender Plus allows a keyboard, monitor, and mouse to be placed up to 600 feet away from the computer. An extender typically has two electronic boxes and several cables between the computer and the peripherals. As the demand for extenders increases, the need for more efficient use of cables has developed.

In existing extenders, standard coaxial cables, shielded cables, and unshielded cables serve as communication channels. In addition, custom cables have been developed to provide an improved communication channel for some extender systems. The cables connecting the computer to the peripherals may be confined in a binder or may be separate cables for each of the desired connections. The apparatus or electronic boxes connected to the ends of each cable serve as interfaces between the computer and the cable at one end and the peripherals and the cable at the other end.

Existing systems typically require nine pairs of wires. Three are for the video signals having red, green, and blue signals. One pair of wires is required for horizontal sync and another pair of wires is for vertical sync. One pair of wires is required for the mouse data, the mouse clock, the keyboard data, and the keyboard clock. Further existing systems do not have provisions for additional peripherals such as speakers, microphones, a modem, serial ports, parallel ports or new devices.

Accordingly, it is the object of this invention to provide for more efficient and improved use of existing cables and at the same time reduce cost. In addition the invention will serve as a means for providing functions not available on existing extension systems.

DESCRIPTION OF THE PREFERRED EMBODIMENT

Figure 1:
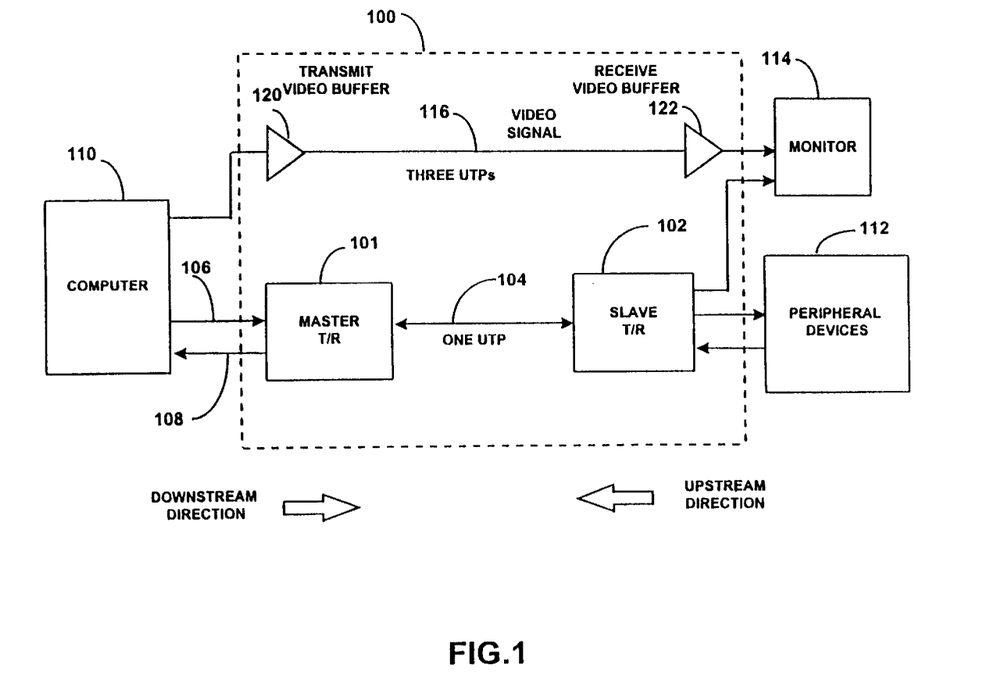
FIG. 1 is a block diagram illustrating a computer coupled to peripherals via an extension system in accordance with the present invention.

FIG. 1 illustrates an extension system 100 in accordance with the present invention. The extension system has a master transmitter and receiver ("T/R") 101 and a slave T/R 102 coupled by one unshielded twisted pair ("UTP") 104. To couple video between a computer 110 and a monitor 114, three UTPs, 116 are used to transfer red, green, and blue video signals. The peripheral devices 112 include at least a mouse and a keyboard. Information or data going from the computer 110 to the peripheral devices 112 is going in the downstream direction and going in the upstream direction when going from the peripherals to the computer. The three UTPs 116 coupling the computer to the video monitor 114, typically would have a master video buffer 120 and a slave video buffer 122. These video buffers are located in the master T/R 101 and the slave T/R 102, but are shown as separate elements for clarity. Although UTPs are used to couple the master T/R 101 and the slave T/R 102 shielded pairs, coaxial cables, and other known cables could provide a communication channel and still be within the scope of the present invention. The one UTP 104 is also used to furnish DC power to the slave T/R 102 from the master T/R 101. A DC power supply located (not shown) in the master T/R is coupled to the one UTP using typical inductive coupling. The slave T/R 102 has an inductive coupling for receiving the DC power. Those persons skilled in the art could determine the levels of voltages required to provide the necessary DC voltage levels at each end of the power providing arrangement. Further common mode signaling is provided by the one UTP 104 for transferring a video horizontal sync signal.

Although the three UTPs 116 serve as a video channel for video signals from the computer as shown in FIG. 1, other arrangements may be used to transfer video signals. The typical video signals from the computer are red (R), green (G) and blue (B) as described in U.S. Pat. No. 5,504,540 which is incorporated herein by reference. The other arrangements may include, for example a coaxial cable or a custom designed cable which may serve as video channels for the video signals from the computer. As will be seen in an embodiment of the present invention horizontal sync signals and vertical sync signals may be sent using the one unshielded twisted pair 104 while R, G, and B are transferred downstream by separate video channels. The present invention is capable of transferring a plurality of peripheral information in both the downstream and the upstream directions.

Figure 2:
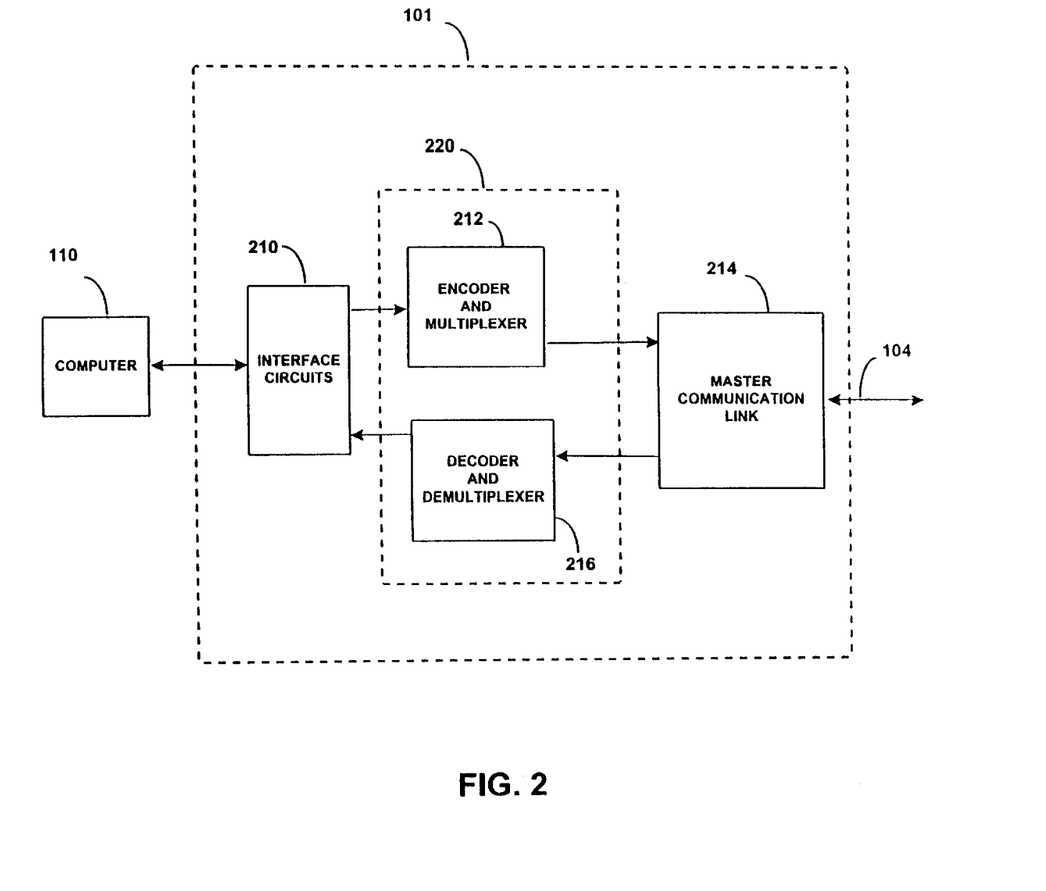
FIG. 2 is a block diagram illustrating components of a master transmitter/receiver in accordance with the present invention.

The master T/R 101 as illustrated in FIG. 2 has interface circuits 210 connecting the master T/R to the computer. The interface circuits provide a coupling between peripherals and logic array 220. Downstream peripheral information in the present invention include mouse data, mouse clock, keyboard data, keyboard clock, and video sync signals. The mouse and keyboard require an open collector connection and the video sync signals may require sync and polarity detectors. The required interface circuits are well known to those skilled in computer design. The interface circuits, in the downstream direction, provide peripheral information to the encoder and multiplexer 212. The encoder and multiplexer arrange the peripheral information into a packet, as will later be described, and transfers the packet to master communication link 214. The master communication link at a predetermined time transmits the packet in the downstream direction using UTP 104. After the transmission has occurred, the master communication link 214 receives upstream information from the peripherals. After receiving the upstream information the master communication link sends the information to the decoder and demultiplexer 216 where the packet is disassembled to obtain peripheral data. The peripheral data is then distributed to the computer using the interface circuits 210.

The logic array 220 comprises logic gates and logic elements. The logic elements are used to provide timing functions, generate a biphase or Manchester line code, and sequence peripheral data in a predetermined packet structure. The logic array 220 may be a programmed logic array ("PLA") or similar device. One such device that may provide the functions for the logic array is a XILINX part number XC9536 which is made by XILINX of San Jose, Calif. Those skilled in the art will also recognize that a microprocessor may be programmed to provide the functions of the logic array 220. Details of interface circuits and logic circuits are contained in provisional application No. 60/043,085 filed by the inventors on Apr. 8, 1997. Those persons working in the field to which the invention pertains could design the circuits to perform the described functions without undue experimentation.

Figure 3:
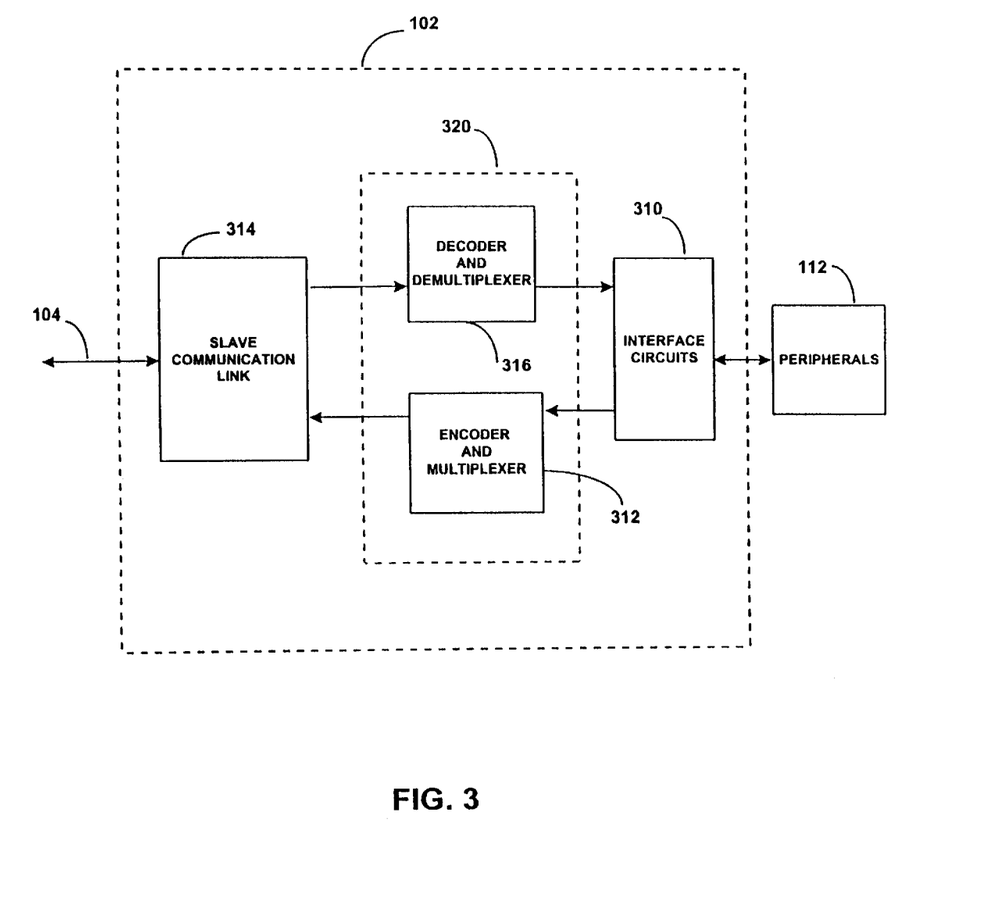
FIG. 3 is a block diagram illustrating components of a slave transmitter/receiver in accordance with the present invention.

Referring now to FIG. 3, there is shown a slave T/R 102 in accordance with the present invention. The slave T/R 102 is coupled to the peripheral devices 112 through interface circuits 310. The interface circuits 310 couple upstream peripheral information to the encoder and multiplexer 312. The encoder and multiplexer 310 arrange the upstream peripheral information in a packet and forward the packet to the slave communication link. The slave communication link then transmits the upstream peripheral information to the master T/R 101 after a predetermined time upon receiving a sync signal from the master T/R. After the slave T/R 102 has transmitted the upstream peripheral information, the slave T/R waits for the next sync and downstream peripheral information. When the slave communication T/R receives downstream peripheral information the decoder and demultiplexer 320 disassemble the packet and forward the information to the peripheral devices via the interface circuits 210. The elements of the master T/R and the slave T/R are nearly identical. A person knowing the functionality of the both devices could build the devices.

The UTP 104 serving as the communication channel in the present invention is one pair in a Category 5 cable. Category 5 cable is designed for use in local area networks and is capable of carrying data in one direction at 12 Megabits per second up to 600 feet when using a Manchester line code. Higher data rates and greater transmission distances may be possible with another line code. The inventor has determined that using the Category 5 cable in a half duplex architecture will allow for data transfer with an overall throughput of 3 Megabits per second in each direction. Packets of 16 bits be sent at a rate of 187,500 packets per second providing the 3 Megabit per second bandwidth. A packet structure containing both downstream and upstream peripheral information is shown in FIG. 4

Figure 4:
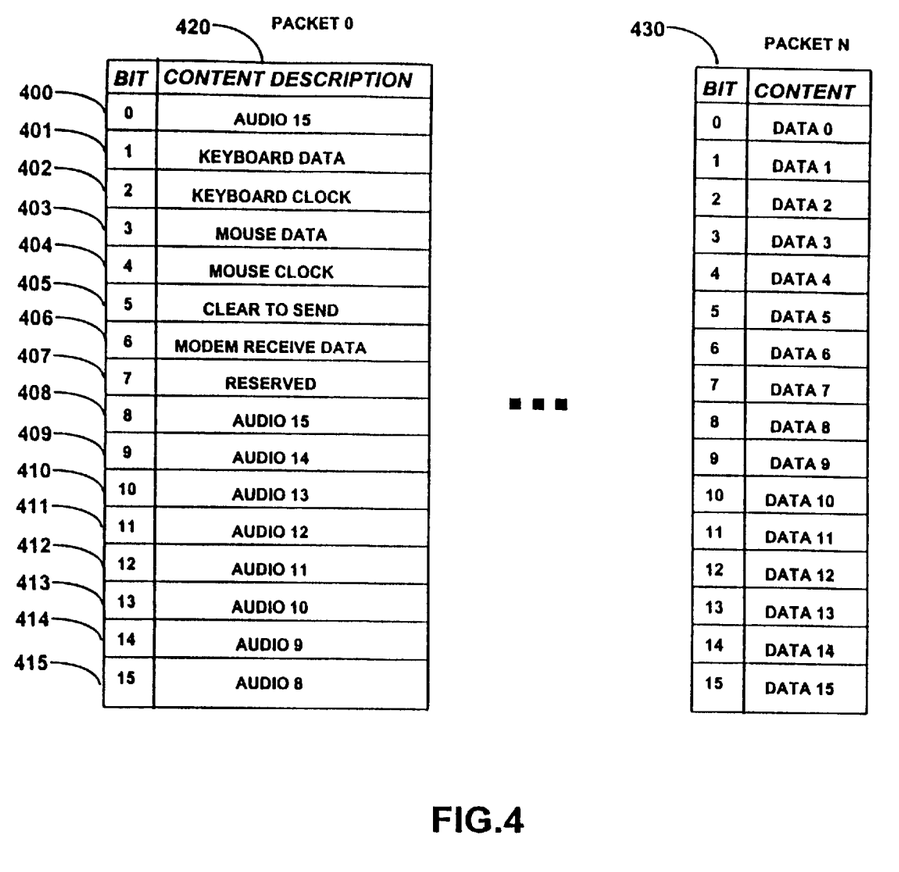
FIG. 4 is a diagram illustrating a framing structure for information transfer in accordance with the present invention.

A first packet, packet 0 420 as shown in FIG. 4 contains 16-bits, 400–415. Each bit represents peripheral information such as keyboard data 401, keyboard clock 402 or is reserved, such as 408, for later use. For one use of the invention, bit 0 represented audio 15, one bit of a 16 bit digital representation of an audio signal. Audio 15 through Audio 8 is represented by bits 8 through 15. Audio 15 was first sent as bit 0 in order to scale a D/A converter in the slave T/R 102. Bits 5 and 6 are modem information, but may be used for other async data. A reserved bit, bit 7, may be used for a future peripheral device. Packets alternate, going downstream, then upstream in a typical half duplex fashion. Four successive packets provide the data for the right and left audio channel. In addition serial control signals are multiplexed over four successive packets. The packet transfer method as described provides 16 channels of 187,500 bits per second in each direction.

Figure 5:
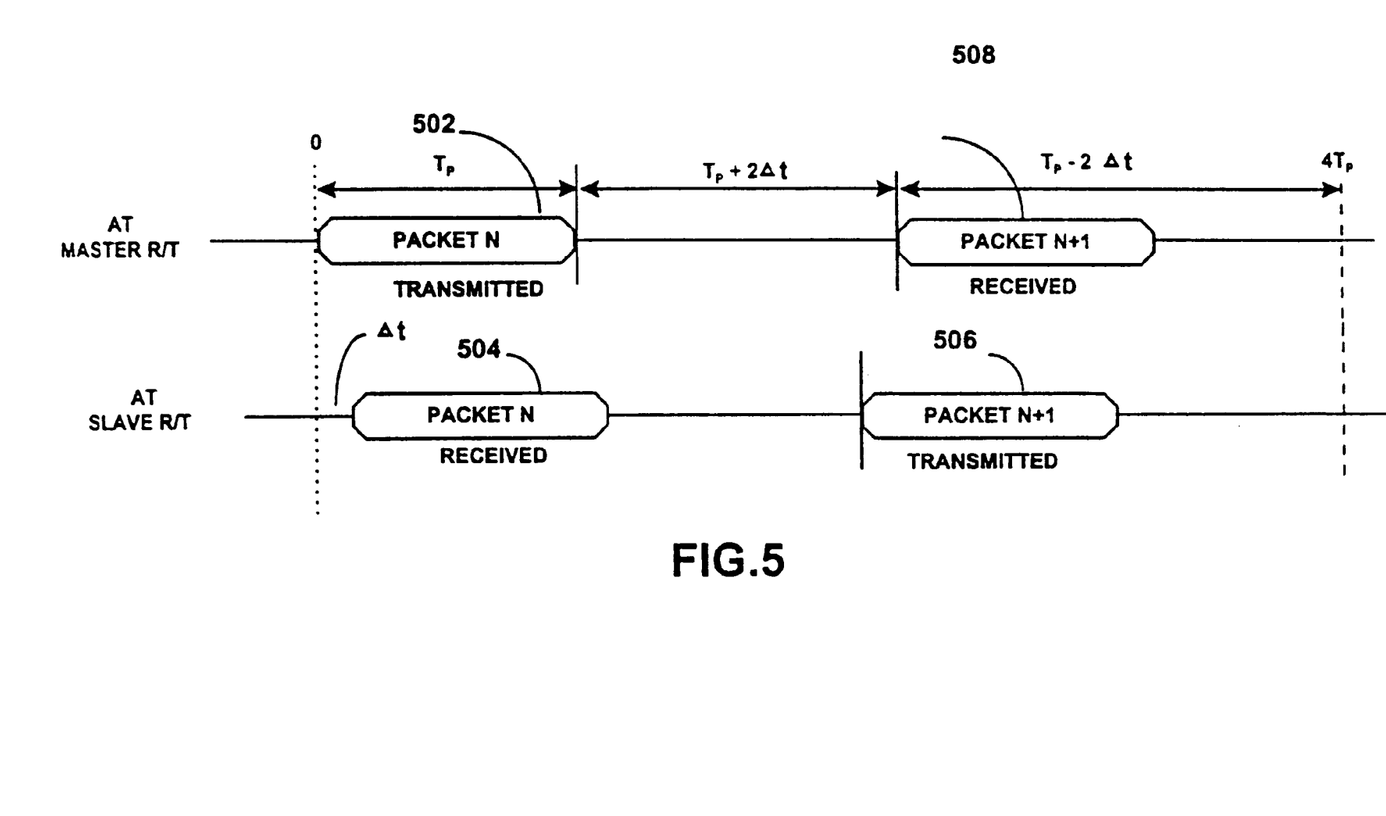
FIG. 5 illustrates the timing sequences for transferring packets between a master T/R and a slave T/R.

An illustration of the timing associated with the protocol for packets is shown in FIG. 5. The master T/R 101 sends downstream the first packet, transmit PACKET N 502 containing computer information being sent to the peripherals, at time zero. At a short time later the slave R/T 102 receives the packet, now received PACKET N 504. When the slave T/R receives the packet a counter is started and at some later predetermined time transmit PACKET N+1 506 is transmitted from slave T/R in the upstream direction. When the master T/R 101 receives the packet, now received PACKET N+1 508, then peripheral information is sent to the computer. Then after a period of time the master T/R sends PACKET N+2. The half duplex method of peripheral information transfer continues as determined by the application requirements.

Figure 6:
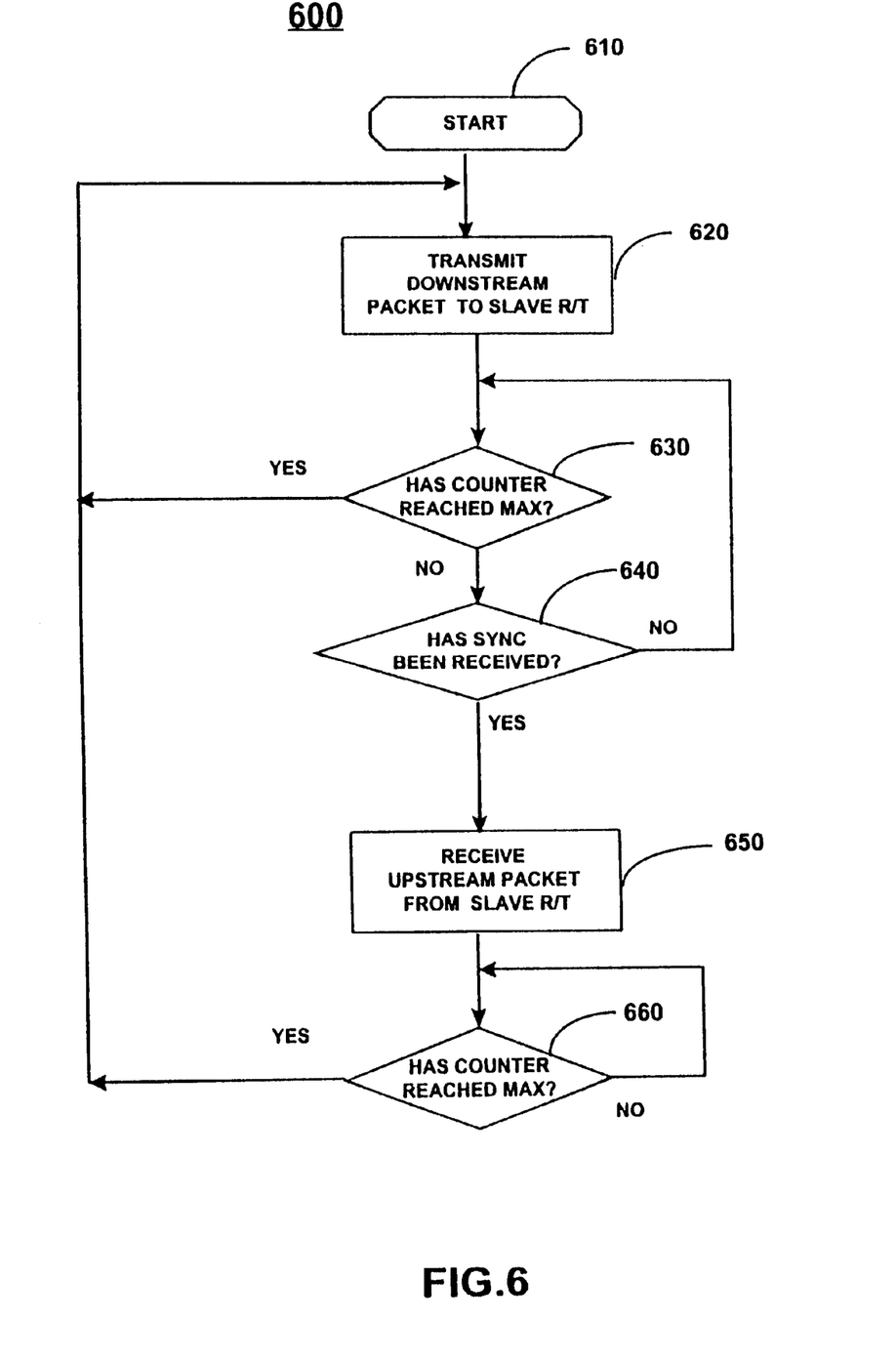
FIG. 6 is a flow chart illustrating steps for transmitting and receiving packets in a master T/R in accordance with the present invention.

FIG. 6 represents the processing events occurring at the master T/R 101. When the master T/R is coupled to the computer and peripheral data is available from the computer, the process starts, step 610. Information from the computer is assembled as a packet and transmitted downstream, step 620, over the UTP 104 to the slave T/R 102. A counter starting at "0" and having a max of "63" is an element within the logic array. If the counter has reached the max value, the YES path of 630, then the transmitter transmits another packet. However if the slave T/R has sent an upstream packet, the NO path of step 630 and the YES path of step 640 are followed. The NO path of step 640 is provided in case the slave T/R is not connected, making it possible for the initiate a transmit from the master T/R when no sync is received from the slave T/R. This arrangement allows for self-synchronization when the units are initially connected or when they are reconnected. Continuing now from the YES path of 640, an upstream packet from the slave T/R is received, step 650. After receipt of the upstream packet, which contains information from the peripheral devices, the counter is again monitored for the MAX value. When MAX is reached, the YES path of step 660 initiates the transmission of another downstream packet.

Figure 7:
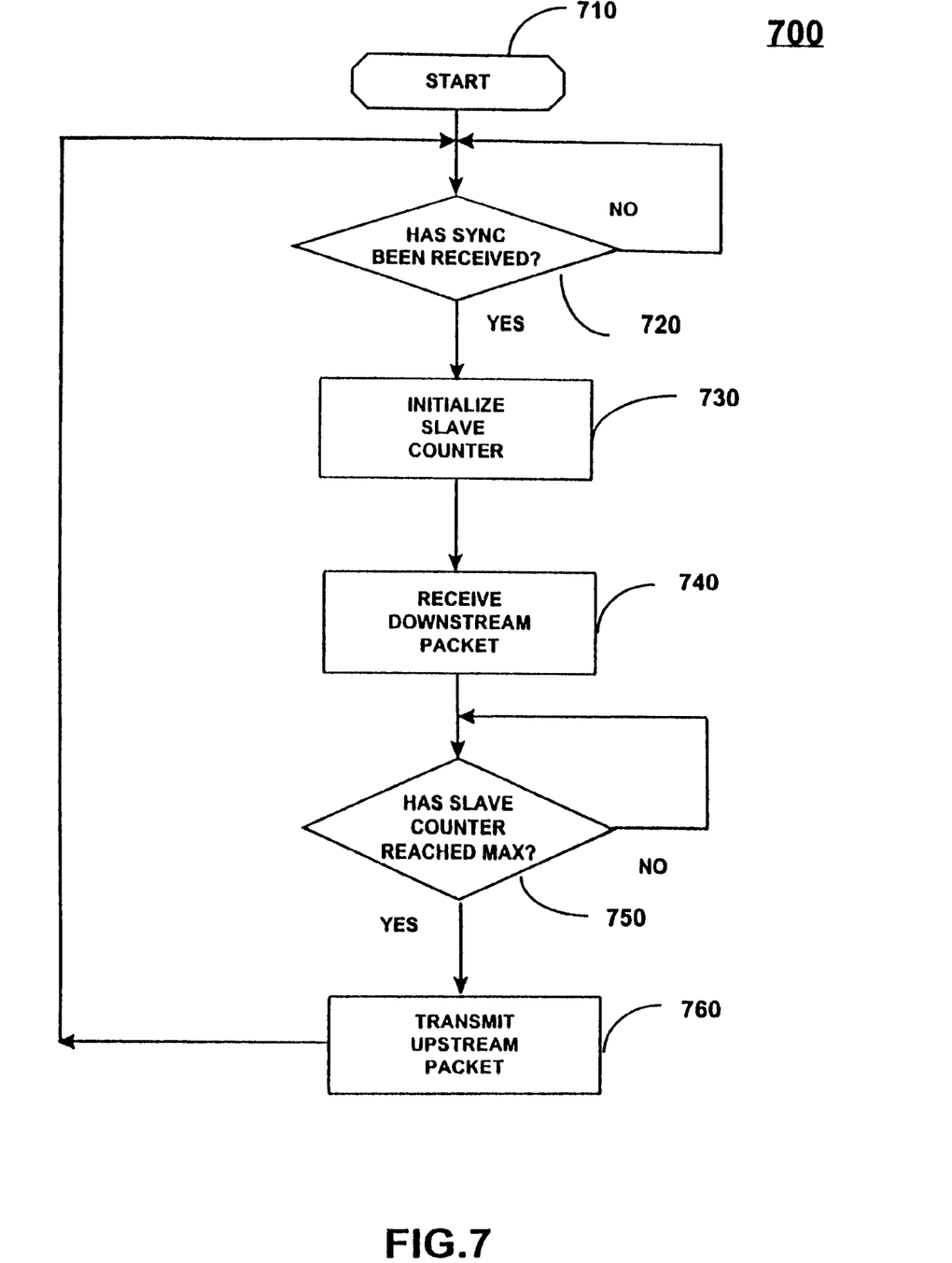
FIG. 7 is a flow chart illustrating steps for transmitting and receiving packets in a slave T/R in accordance with the present invention.

FIG. 7 illustrates the flow of information in the slave T/R. After the slave T/R is started, step 710 a sync detector looks for a sync signal from the master T/R. The NO path of step 720 represents the look mode for the sync detector. If a sync is detected, the YES path of step 720, the a slave counter is initialized, step 730 and the slave T/R receives a downstream packet 740. The slave counter continues to count, the NO path of step 750, until a MAX is reached. When the counter reaches a MAX, the YES path of step 750, the slave T/R transmits an upstream packet, step 760 and then returns to wait for the next sync, step 720.

A sync is detected from a packet, whether upstream or downstream, when the decoding logic element detects a transition from zero voltage level to one voltage level. Although sync detection is well understood and used by persons in data communication, the details of an embodiment in accordance with the present invention as given above is shown in detail in the incorporated provisional application No. 60/043,085 filed on Apr. 8, 1997.

Because of transmission delays in the one UTP 104 connecting the master T/R 101 and the slave T/R 102, a peripheral latchup condition may occur. A means for avoiding lockup is to place an override bit in either a downstream packet or an upstream packet. In one embodiment every other downsteam packet contained a mouse override bit at location bit 0. To prevent the possibility of keyboard latch every other bit 0 in upstream packets is a keyboard override bit.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

We claim:

1. A system for operatively linking a computer to first and second peripheral devices through a communication link extender, comprising:
    a master transceiver operatively linking the computer to one end of the communication link extender, and receiving a stream of computer data packets from the computer, sampling the computer data packets into a stream of consecutive computer samples, and loading the consecutive computer samples sample-by-sample into a stream of consecutive master frames, one sample per master frame; and
    a slave transceiver operatively linking the first and second peripheral devices to a distal end of the communication link extender, receiving a stream of first peripheral data packets from the first peripheral device and a stream of second peripheral data packets from the second peripheral device, sampling the first peripheral data packets into a stream of first consecutive peripheral samples and sampling the second peripheral data packets into a stream of second consecutive peripheral samples, and loading together consecutive ones of each of the first and second peripheral samples into a stream of consecutive slave frames, one first peripheral sample and one second peripheral sample per slave frame;
    the master transceiver, at a first time, sending one of the master frames in the stream of consecutive master frames to the slave transceiver via the communication link extender, to be decoded at the slave transceiver into the stream of computer data packets in near real time; and
    the slave transceiver, at a second time, sending one of the slave frames in the stream of consecutive slave frames to the master transceiver via the same communication link extender, to be decoded at the master transceiver into the streams of first and second peripheral data packets in near real time wherein each frame includes dedicated portion for bits of different peripheral device packets.

2. The system of claim 1 wherein the communication link extender includes an unshielded twisted pair in a bundle of unshielded twisted pairs.

3. The system of claim 1, wherein the stream of first peripheral data packets includes one from the group consisting of: mouse data, mouse clock, keyboard data and keyboard clock.

4. The system of claim 3 wherein the stream of second peripheral data packets includes one from the group consisting of: mouse data, mouse clock, keyboard data, and keyboard clock.

5. The system of claim 4 wherein at least one of the first and second streams of peripheral data packets further includes asynchronous data.

6. The The system of claim 5 wherein the slave transceiver further reviews, samples and loads a stream of third peripheral data packets of audio signals.

7. The system of claim 1 wherein the stream of computer data packets includes video data transferred from the first site to the second site on one or more separate channels.

8. The system of claim 1 wherein the slave transceiver sends the slave frames a distance greater than 200 feet.

9. A range extension system for connecting a computer at one site to peripherals and a video terminal at a second site using a single pair of wires for a peripheral communications channel and video channels for video signals from the computer, where the direction from the computer towards the peripherals and the video terminal is the downstream direction, a master transmitter for transferring a plurality of peripheral information and for transferring video signals downstream, the master transmitter comprising:
    a video buffer coupled for receiving computer video signals, the video buffer having a transmitter for transmitting computer video signals over the video channel in the downstream directions;
    means for multiplexing, encoding, and framing peripheral information from the computer; and
    a master communication link coupled to one end of the single pair of wires, the master communication link further being coupled to the means for multiplexing, the master communication link having an amplifier for transmitting the framed peripheral information downstream, thereby providing peripheral information to a slave station at the other end of the pair of wires wherein each frame includes dedicated portion for bits of different peripheral device packets.

10. The master transmitter of claim 9 wherein the video channels comprise three pairs of wires.

11. The master transmitter of claim 10 wherein the pair of wires for the peripherals and the three pairs of wires are in the same binder.

12. A system as in claim 1, wherein at least one of the master and slave transceiver further transmits to the other of the master and slave transceiver an override bit to prevent a peripheral latch-up condition.

13. A system as in claim 1, wherein at least one of the master and slave transceiver further transmits to the other of the master and slave transceiver an first override bit associated with the first peripheral device to prevent a latch-up condition associated with the first peripheral device.

14. A system as in claim 13, wherein at least one of the master and slave transceiver also further transmits to the other of the master and slave transceiver a second override bit associated with the second peripheral device to prevent a latch-up condition associated with the second peripheral device.

15. A system as in claim 13, wherein the first override bit is inserted into the stream of first consecutive peripheral samples.

16. A system as in claim 14, wherein the first override bit is inserted into the stream of first consecutive peripheral samples and the second override bit is inserted into the stream of second consecutive peripheral samples.

17. A system as in claim 16, wherein the first override bit is a mouse override bit and the second override bit is a keyboard override bit.

18. A system for operatively linking a computer to a keyboard and a mouse through a communication link extender, comprising:
   a master transceiver operatively linking the computer to one end of the communication link extender, and receiving a stream of computer data packets from the computer, sampling the computer data packets into a stream of consecutive computer samples, and loading the consecutive computer samples sample-by-sample into a stream of consecutive master frames;
   a slave transceiver operatively linking the first and second peripheral devices to a distal end of the communication link extender; receiving streams of keyboard data, keyboard clock, mouse data and mouse clock signals from the keyboard and mouse, sampling the keyboard data, keyboard clock, mouse data and mouse clock signals into respective streams of keyboard data samples, keyboard clock samples, mouse data samples, and mouse clock samples; loading consecutive ones of the keyboard data samples, keyboard clock samples, mouse data samples, and mouse clock samples into sample locations of consecutive slave frames;
   the master transceiver, at a first time, sending one of the master frames in the stream of consecutive master frames to the slave transceiver via the communication link extender, to be decoded with others of said master frames at the slave transceiver into the stream of computer data packets in near real time; and
   the slave transceiver, at a second time, sending one of the slave frames in the stream of consecutive slave frames to the master transceiver via the same communication link extender, to be decoded with others of said master frames at the master transceiver into the streams of keyboard data, keyboard clock, mouse data and mouse clock signals in near real time wherein each frame includes dedicated portion for bits of different peripheral device packets.

19. A system as in claim 18, wherein the slave transceiver loads the consecutive ones of the keyboard data samples, keyboard clock samples, mouse data samples, and mouse clock samples into dedicated keyboard data, keyboard clock, mouse data and mouse clock frame locations in the consecutive slave frames.

20. A system as in claim 18, wherein the slave transceiver further receives audio data, samples the audio data, and loads the sampled audio data with the keyboard data, keyboard clock, mouse data and mouse clock samples into consecutive slave frames.

21. A system as in claim 20, wherein the slave transceiver further receives plural streams of audio data, samples the plural streams of audio data, and loads the plural streams of sampled audio data with the keyboard data, keyboard clock, mouse data and mouse clock samples into consecutive slave frames.

22. A system as in claim 18, wherein the slave transceiver from time to time includes a clear to send command in the consecutive slave frames.

23. A system as in claim 18, wherein the computer data packets from the computer comprise video data.

24. A system as in claim 18, wherein the slave transceiver further receives video sync signals, samples the video sync signals, and loads the sampled video sync signals with the keyboard data, keyboard clock, mouse data and mouse clock samples into consecutive slave frames.

25. A system as in claim 18, wherein at least one of the master and slave transceiver further transmits to the other of the master and slave transceiver an override bit to prevent a peripheral latch-up condition.

26. A system as in claim 18, wherein at least one of the master and slave transceiver further transmits to the other of the master and slave transceiver a first override bit associated with the keyboard to prevent a latch-up condition associated with the keyboard.

27. A system as in claim 26, wherein least one of the master and slave transceiver also further transmits to the other of the master and slave transceiver a second override bit associated with the mouse to prevent a latch-up condition associated with the mouse.

28. A system as in claim 25, wherein the first override bit is inserted into the stream of keyboard data samples.

29. A system as in claim 25, wherein the first override bit is inserted into the stream of mouse data samples.

30. A system as in claim 25, wherein the first override bit is inserted into the stream of mouse clock samples.

31. A system as in claim 25, wherein the first override bit is inserted into the stream of keyboard clock samples.

32. A system as in claim 27, wherein the first override bit is inserted into the stream of keyboard data samples and the second override bit is inserted into the stream of mouse data samples.

33. A method of extending data transmission between a computer and a peripheral device, comprising:
   receiving a stream of computer data and sampling the stream of computer data into a stream of computer data samples;
   framing the stream of computer data samples into computer-side frames;
   receiving a stream of peripheral device data from the peripheral device and sampling the peripheral device data into a stream of peripheral data samples;
   creating a peripheral-side frame having X number of dedicated frame locations, N number of said frame locations being dedicated to the peripheral device data, where N is an integer less than X;
   loading N of the stream of peripheral data samples into a created peripheral-side frame; and
   sending the peripheral-side frames to the computer and the computer-side frames to the peripheral device via a common communication extender channel; and
   re-creating the computer data and the peripheral device data respectively from the computer-side frames and the peripheral-side frames.

34. A method according to claim 33, further including:
   initializing a slave counter upon receiving a computer-side frame; and
   transmitting a peripheral-side frame when the slave counter has reached a slave max value.

35. A method as in claim 33, where N is one.

36. A method as in claim 33, further including the steps of:
   receiving a plurality of streams of different peripheral device data from different peripheral devices and independently sampling the plurality of streams of peripheral device data into respective streams of peripheral data samples;
   creating a peripheral-side frame having frame locations, some of said frame locations being dedicated to each of the plurality of streams of different peripheral device data;

loading the streams of peripheral data samples into a created peripheral-side frame at corresponding ones of the frame locations;

sending the peripheral-side frames; and re-creating the plurality of streams of different peripheral device data from the peripheral-side frames.

37. A method as in claim 36, wherein the plurality of streams include one or more from the group consisting of:

keyboard data signals, keyboard clock signals, mouse data signals, mouse clock signals, video sync signals, and audio signals.

38. A method as in claim 33, further including the step of transmitting an override bit to prevent a peripheral latch-up condition.

39. A method as in claim 36, further including the step of transmitting a first override bit associated with a first of the plurality of streams of different peripheral device data to prevent a latch-up condition associated with a first peripheral device, and a second override bit associated with a second of the plurality of streams of different peripheral device data to prevent a latch-up condition associated with a second peripheral device.

40. A method as in claim 39, wherein the first override bit is associated with a keyboard.

41. A method as in claim 40, wherein the second override bit is associated with a mouse.

42. A method as in claim 33, wherein the computer data and the peripheral device data are re-created in near real time.

43. A method of operatively linking a computer to a keyboard through a communication link extender, comprising:

receiving a stream of keyboard data bytes and keyboard clocks;

sampling the keyboard data bytes into keyboard data sample bits;

sampling the keyboard clocks into keyboard clock sample bits; and loading one keyboard data sample bit together with one keyboard clock sample bit into a common frame, and repeating the loading step for each next keyboard data sample bit and each next keyboard clock sample bit into a next common frame in a sequence of common frames;

transmitting the sequence of common frames; and re-creating the stream of keyboard data bytes and the keyboard clocks from the sequence of common frames.

44. A method of operatively linking a computer to a keyboard and mouse through a communication link extender, comprising:

receiving a stream of keyboard data bytes and keyboard clocks;

receiving a stream of mouse data bytes and mouse clocks;

sampling the keyboard data bytes into keyboard data sample bits and the keyboard clocks into keyboard clock sample bits;

sampling the mouse data bytes into mouse data sample bits and the mouse clocks into mouse clock sample bits;

loading a keyboard data sample bit, a mouse data sample bit, a keyboard clock sample bit, and a mouse clock sample bit into a common frame, and repeating the loading step for each next keyboard data sample bit, and each next keyboard clock sample bit, mouse data sample bit, and mouse clock sample bit into a next common frame in a sequence of common frames;

transmitting the sequence of common frames; and re-creating the stream of keyboard data bytes, keyboard clocks, mouse data bytes and mouse clocks from the sequence of common frames.

* * * * *